United States Patent [19]

Pieper

[11] 4,046,547
[45] Sept. 6, 1977

[54] GLASS MELTING FURNACE AND PROCESS FOR IMPROVING THE QUALITY OF GLASS

[75] Inventor: Helmut Pieper, Lohr, Germany

[73] Assignee: Sorg GmbH & Co. KG, Plochsbach, Germany

[21] Appl. No.: 694,863

[22] Filed: June 10, 1976

[51] Int. Cl.² .............................................. C03B 5/26
[52] U.S. Cl. ...................................... 65/135; 65/136; 65/346; 65/347
[58] Field of Search ................. 65/134, 135, 136, 346, 65/347

[56] References Cited
U.S. PATENT DOCUMENTS

| 1,959,417 | 5/1934 | Flexon | 65/347 |
| 3,328,150 | 6/1967 | Rough | 65/346 X |
| 3,942,968 | 3/1976 | Pieper | 65/134 |

Primary Examiner—Arthur D. Kellogg
Attorney, Agent, or Firm—Burgess, Dinklage & Sprung

[57] ABSTRACT

Glass is melted in a furnace having a melting zone and one or more processing zones adjacent to the melting zone. A volume of molten glass is caused to flow from the melting zone to the processing zone in a volume which exceeds the volume of glass withdrawn from the processing zone. The excess volume of glass is returned to the melting zone or to a separate refining zone. The furnace includes a melting section and at least one adjacent processing tank communicating with the melting section through a passage. A recirculating passage is provided between the processing tank and the melting section and additional means are provided to establish a circulating flow of molten glass via the recirculating passage.

9 Claims, 8 Drawing Figures

GLASS MELTING FURNACE AND PROCESS FOR IMPROVING THE QUALITY OF GLASS

BACKGROUND

This invention relates to a method for operating a glass melting furnace having a melting portion and one or more processing or working tanks positioned adjacent thereto, as well as to a glass melting furnace for carrying out such method and having a melting portion and at least one processing tank communicating therewith through a passage.

In the processing tanks of glass melting furnaces from which the glass is withdrawn manually, mechanically or by means of feeders, glass defects are caused depending on the type and quantity of withdrawal. Heretofore, such defects could not be eliminated.

In manual withdrawal using gathering irons, in discharge of spherical feeders or in drawing of the glass by vacuum, bubbles are inherently produced because of the relatively high viscosity of the glass within the processing tank where temperatures are normally between 1050° and 1250° C. At best, such bubbles can only be incompletely removed heretofore.

Another drawback, particularly with low volumes of withdrawal, and which also occurs in the discharge or withdrawal of glass using feeders, is a temperature inhomogeneity which is due to a greater amount of thermal energy being dissipated in the processing tank through the basin wall than is supplied by fresh glass from the melting tank. This means that the glass must normally be heated by means of burners. However, because heat emission takes place in a position different from the position of heat supply, temperature inhomogeneities are unavoidable. Another interfering factor is observed in glasses containing volatile components, such as boron, lead or fluorine. Because of the open glass surface within the processing tank and heating by means of burners, these glass constituents are vaporized at the surface of the melt which means that the surface glass has a composition different from that of the bottom glass. This undesirably and inherently results in chemical inhomogeneity and striation. Naturally the effect of this depends on the volume discharged in relation to the open glass surface. In the case of varying discharges, the intensity of this effecct thus decreases or increases, and it cannot be conpensated for in such cases.

It has been proposed to eliminate these well-recognized drawbacks by means of agitation with the aid of agitators. However, only a partial solution to the problem can be realized in this fashion. Although improvement can be obtained in the case of temperature inhomogeneities by proper operation of the agitators, the stagnation of cold glass at the bottom cannot be avoided. Furthermore, in the case of bubble formation, agitation merely results in dispersion and size reduction of such bubbles, which then are more resistant to break-up via an increasing accumulation of bubbles which takes place with the lapse of time.

SUMMARY

The present invention provides a method for improving the quality of the glass within the processing tanks of glass melting furnaces which does not suffer from the above-mentioned drawbacks. The invention also provides a glass melting furnace which permits the withdrawal or discharge of thermally and chemically homogeneous glass at any time, both manually and mechanically or by means of feeders and regardless of the load.

The glass melting furnace of the present invention can be economically produced and easily operated, and the method of the invention can be readily monitored and controlled in an easy manner even by untrained personnel. Moreover, the accumulation of bubbles within the process tanks is prevented.

According to the present invention, a volume of molten glass is caused to flow from the melting portion of the furnace into the processing tank; this volume of flow exceeds the glass volume discharged from the processing tank, and the excess volume of glass is returned or recirculated to the melting portion of the furnace.

The apparatus of the invention includes melting means and at least one processing tank means communicating with said melting through passage means, recirculating passage means between said processing tank means and said melting means, and means for establishing a circulating flow of molten glass via said recirculating passage means. The recirculating means preferably opens into the upper portion of the melting means.

Other embodiments of the method and the glass furnace of the invention are disclosed herein.

DESCRIPTION OF THE DRAWING

Exemplary embodiments of the present invention are described in detail below with reference to the accompanying drawings, wherein.

DESCRIPTION

Figure 1:
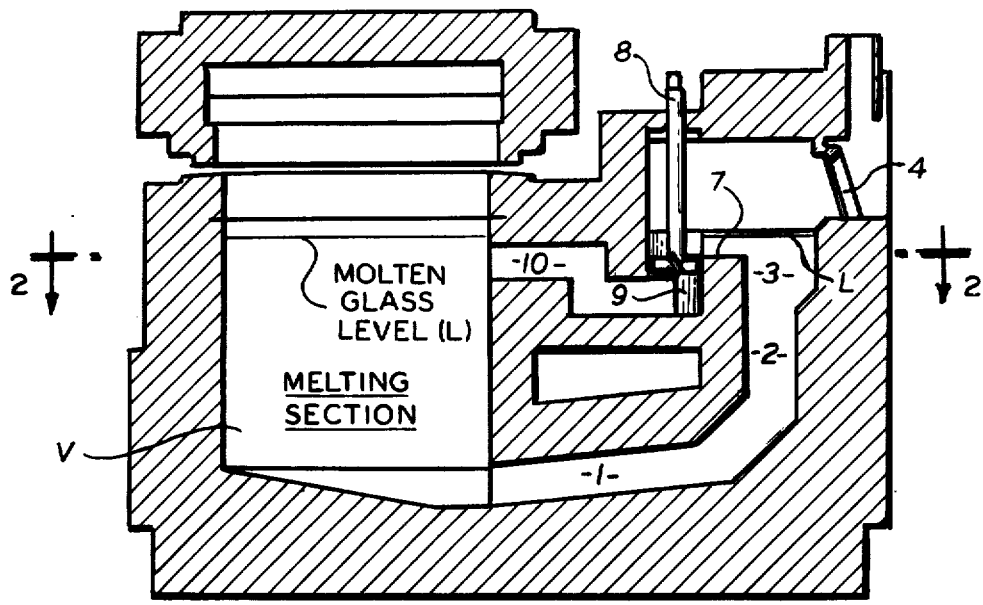
FIG. 1 is a cross-sectional view of a glass melting furnace according to the invention, providing for return flow of excess glass from the processing tank.
Figure 7:
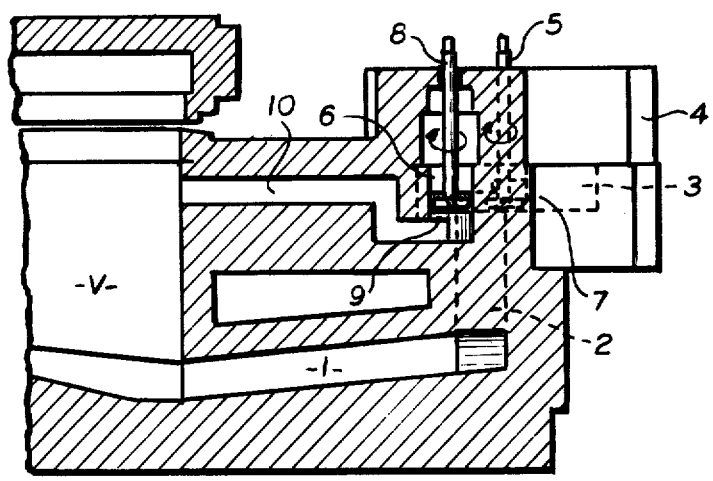
FIG. 7 is a vertical sectional view of a furnace according to FIG. 5 provided with a pair of processing tanks and one agitator each, above the riser of each processing tank.
Figure 8:
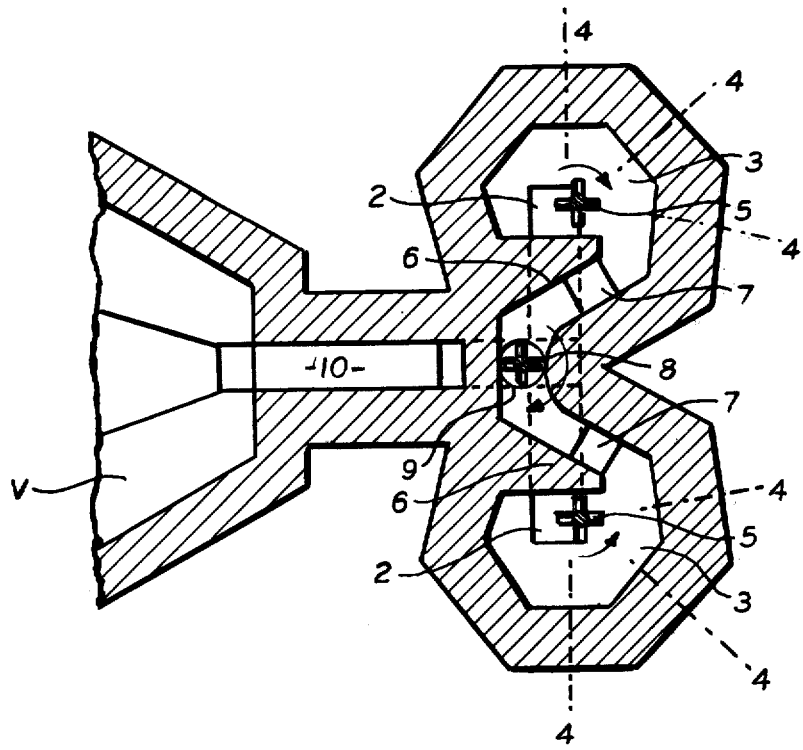
FIG. 8 is a horizontal sectional view of the furnace of FIG. 7.

As shown in FIG. 1, the glass is molten in the melting portion of a glass melting furnace and is passed to an operating portion or processing tank 3 through a passage 1 and a riser 2. However, unlike conventional constructions, passage 1 does not terminate in the side wall of the processing tank 3, but rather extends laterally from below to a point closely adjacent the withdrawal or discharge port 4. In the case of a plurality of discharge ports 4, the glass flow may be split up in the terminal portion of the riser 2 as shown in FIGS. 7 and 8, so as to take the shortest possible route to the discharge position.

As shown in FIGS. 3 to 8, agitators 5 may be installed above the riser passage 2 within the processing 2 tank 3. These agitators are normally provided with angularly disposed blades so as to transport the advancing fresh glass upwards towards the surface and to the discharge port 4. For this, the leading edge of each blade is tilted downwards, i.e., is in a lower position as compared to the trailing edge.

The glass flows under the discharge port 4 and thereafter, on its path back into the melting portion, over a barrier or weir 7 which allows only surface glass to flow thereacross. The glass then flows to another agitator 8 mounted within a vertical duct 9 of circular cross-section and which is likewise provided with inclined blades. Duct 9 receives molten glass flowing over weir 7.

The direction of rotation of agitator 8 is such that the upper edges of the blades lead in the direction of rotation, such that a pumping action is produced in the glass which causes the glass to flow in downward direction. As the glass temperature is relatively low in duct 9, the cold glass tends to descend and the natural flow is increased by the agitator.

The duct has a height corresponding to the width of the blades of the agitator 8, and it merges at its lower end into a horizontal passage or channel 10 which opens into the melting portion V or into a separate, independently heated refining compartment (not shown). The refining compartment may be connected to the processing tank via a port.

In another embodiment, the agitator 8 may draw the glass up from below and lift the glass above a barrier, such that the glass is urged into a port or channel communicating with the melting portion V or the separate refining portion.

In a glass melting furnace of this type, a circulating flow returning into the melting portion V is produced, whereby the action of agitators 5 and 8 is additive. Thus, a volume of glass which flows through the passage 1 exceeds the volume discharged by the volume recirculated.

The volume of the circulating flow depends on the speed of rotation of agitator 8, such that this volume may be adjusted in accordance with specific requirements.

The glass returned into the melting tank V is admixed with the molten glass present in tank V, re-heated and refined again. In greater detail, this mode of operation can be provided with particular ease when using an electrical melting tank having two or more planes of electrodes as disclosed in U.S. Pat. No. 3,742,111. However, it is also possible to employ conventionally heated melting tanks. As the recirculated glass is admixed with the substantially greater volume of glass within the melting tank V, the melting process is not interfered with and the returned glass flow is again fed to processing tank 3 via passage 1.

The method of operation according to the invention and the corresponding glass melting furnace provided the following advantages:

Bubbles produced during discharge are rapidly removed from the discharge area of tank 3 by the controlled surface flow, and such bubbles are returned to the melting tank to be refined again therein.

Inhomogeneities of temperature are avoided because the processing tank 3 may be supplied at any time with such a quantity of fresh, hot glass as to compensate for wall losses. Thus, the burners positioned in the processing space are required to compensate for thermal losses in the upper portion of the furnace only without heating the glass as such.

In the case of glasses containing vaporizable or volatile components, the gradual surface depletion of boron, fluorine or lead is substantially lower because of the shorter retention period within the processing tank 3. Before reaching a discharge position again, the glass is homogenized by one or more agitators and admixed with a great volume of glass in the melting space V. In this way, chemical inhomogeneities are also avoided.

Furthermore, freezing of the passage or port that occurs with small volumes of discharge is avoided, because a relatively great volume of glass is constantly fed through the passage. Draining of the processing tank with the resulting loss of glass, or heating of the passage or port, can thus be dispensed with.

Figure 2:
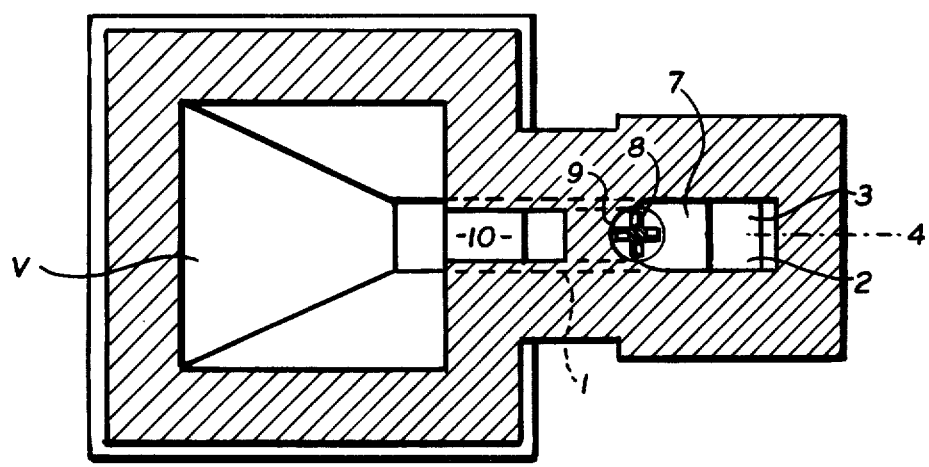
FIG. 2 is a horizontal sectional view of the furnace of FIG. 1.
Figure 3:
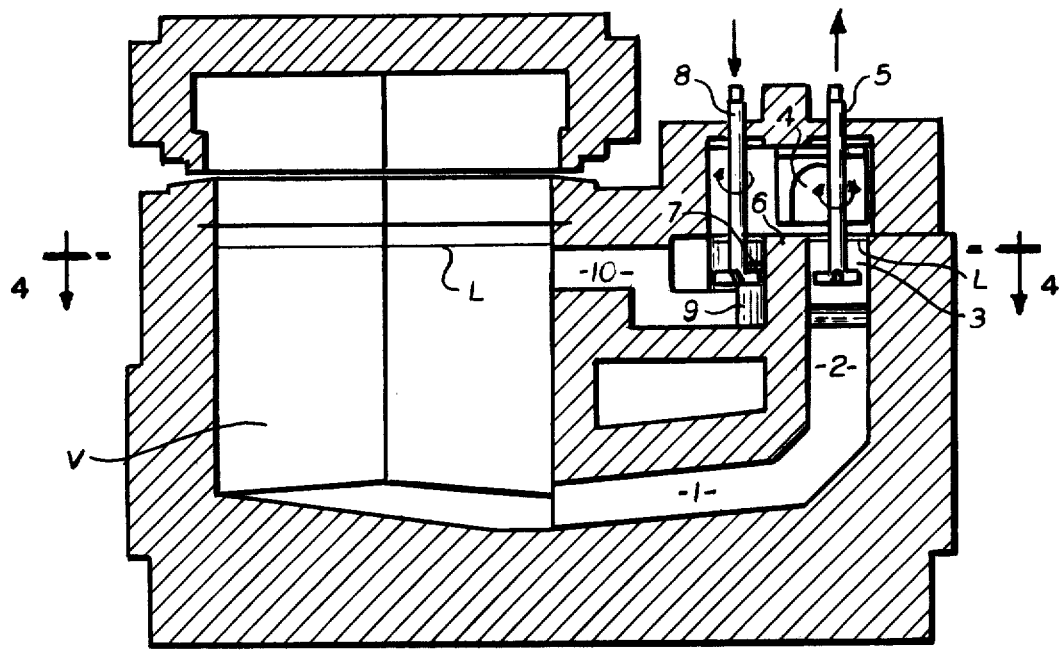
FIG. 3 is a cross-sectional view similar to FIG. 1 showing an agitator in the riser portion of the processing tank.
Figure 4:
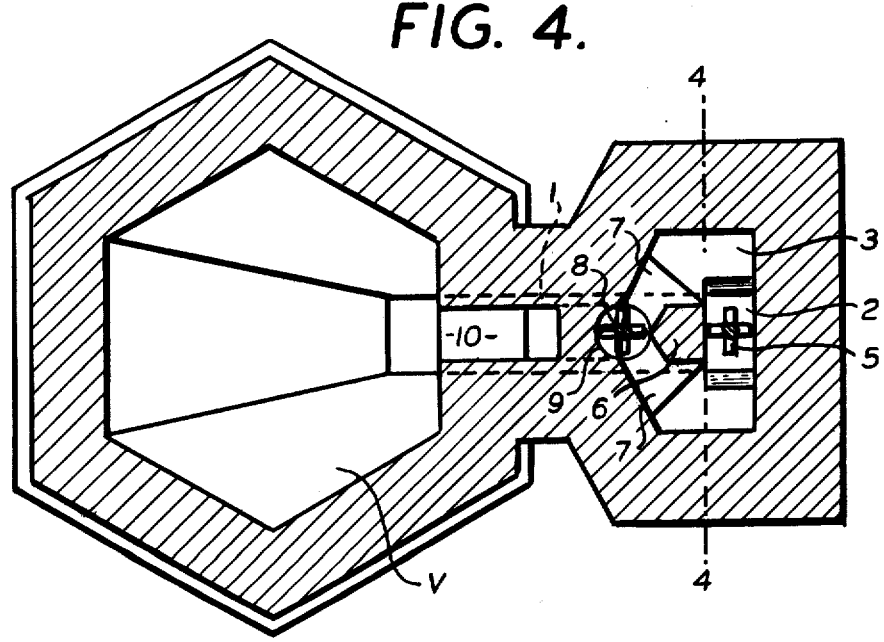
FIG. 4 is a horizontal sectional view of the furnace of FIG. 3 showing a pair of rabbling (withdrawing or discharging) holes (openings)

The glass melting furnace according to the present invention is capable of operating in various ways. For example, as shown in FIGS. 1 and 2, an agitator within processing tank 3 is not necessary. As illustrated in FIGS. 7 and 8, a pair of processing tanks 3 may be disposed in side-by-side relation, fed via a common passage 1 and provided with a common return port or channel 9 which is equipped with only one agitator 8. Each riser 2 has an agitator 8 installed therein. In this case, the risers 2 in the tank bottom are of short length such that as large as possible a volume of glass can flow through the common passage 1.

Figure 5:
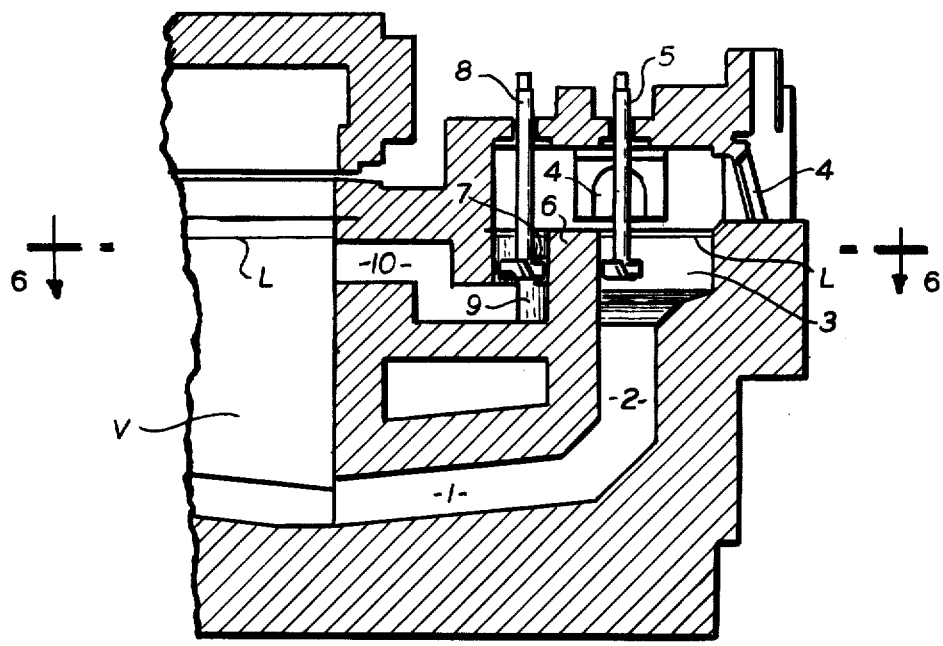
FIG. 5 is a cross-sectional view of a furnace according to the invention having a processing tank having three rabbling holes and agitators, similar to FIGS. 3 and 4.
Figure 6:
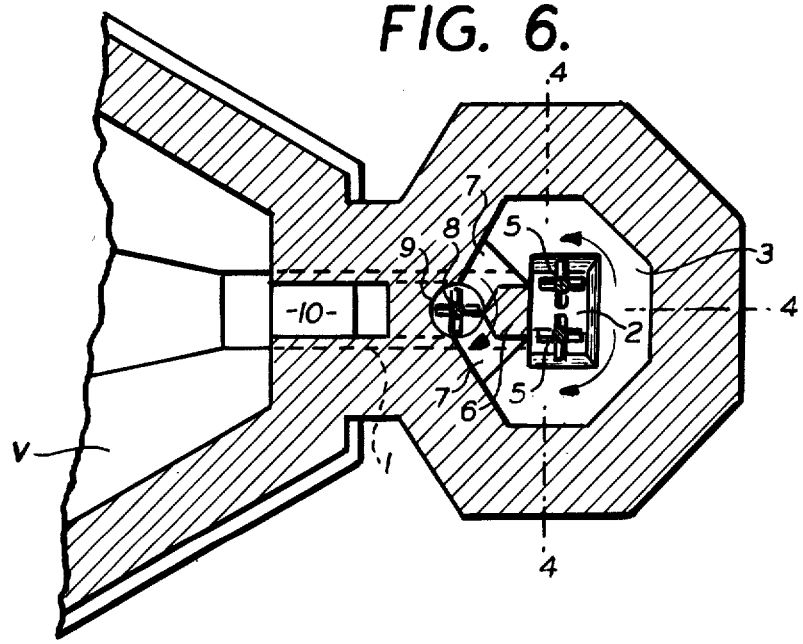
FIG. 6 is a horizontal sectional view of the furnace of FIG. 5.

As shown in FIG. 5, as the agitator means in tank 3, a pair of agitators 8 arranged in side-by-side relation may operate in counterrotating fashion, whereas single agitators 8 are used in FIGS. 7 and 8.

The glass melting furnace and method of the present invention offers a number of advantages with low technical expenditure, and represents an ideal solution to existing problems.

What is claimed is:

1. In a method for operating a glass melting furnace having a melting zone and one or more processing zones disposed adjacent to said melting zone wherein a portion of the molten glass flowing from said melting zone to said processing zone is recirculated to said melting zone, the improvement which comprises recirculating said molten glass from said processing zone by withdrawing molten glass to be recirculated laterally in a surface flow from said processing zone and thereafter causing the withdrawn molten glass to flow downwardly while applying a submerged, downwardly directed impulse thereto.

2. Method of claim 1 wherein the volume of glass flowing into said processing zone is a multiple of the volume of glass withdrawn therefrom.

3. Method of claim 1 wherein the volume of glass flowing into said processing zone exceeds the volume of glass withdrawn therefrom by a factor of from three to ten.

4. Method of claim 1 wherein the recirculated glass flows into the upper part of the melting zone of an all electric vertical glass melting furnace.

5. In a glass melting furnace having melting means and at least one processing tank means communicating with said melting means through passage means and recirculating passage means between said processing tank means and said melting means, the improvement which comprises means for establishing a recirculating flow of molten glass via said recirculating passage means including weir means positioned in said processing tank means upstream of the inlet to said recirculating passage means and a downwardly directed portion in the recirculating passage means having agitator means submerged therein to apply a downwardly directed impulse to the recirculating molten glass.

6. Glass melting furnace of claim 5 wherein said recirculating passage means opens into the upper portion of said melting means, being part of an all electric vertical glass melting furnace.

7. Glass melting furnace of claim 5 wherein each processing tank means has positioned therein at least one agitator means acting in the direction of flow.

8. Glass melting furnace of claim 5 wherein the blades of said agitator means extend to a point closely adjacent the wall of the downwardly directed portion of said recirculating passage means.

9. Glass melting furnace of claim 7 wherein a pair of agitator means in a side-by-side arrangement and having opposite directions of rotation are provided.

* * * * *